(12) United States Patent
Matsuoka

(10) Patent No.: US 11,233,931 B2
(45) Date of Patent: Jan. 25, 2022

(54) IMAGE PROCESSING DEVICE, IMAGING DEVICE, CONTROL METHOD FOR IMAGE PROCESSING DEVICE, AND RECORDING MEDIUM

(71) Applicant: CANON KABUSHIKI KAISHA, Tokyo (JP)

(72) Inventor: Masaaki Matsuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/898,523

(22) Filed: Jun. 11, 2020

(65) Prior Publication Data

US 2020/0412964 A1     Dec. 31, 2020

(30) Foreign Application Priority Data

Jun. 25, 2019 (JP) .............................. JP2019-117721

(51) Int. Cl.
*H04N 5/232* (2006.01)
*H04N 5/369* (2011.01)

(52) U.S. Cl.
CPC . *H04N 5/232121* (2018.08); *H04N 5/232945* (2018.08)

(58) Field of Classification Search
CPC ....... H04N 5/232121; H04N 5/232127; H04N 5/232939
See application file for complete search history.

(56) References Cited

U.S. PATENT DOCUMENTS

| 2016/0127636 A1* | 5/2016 | Ito ........................ G06F 3/0486 348/333.12 |
| 2017/0064192 A1* | 3/2017 | Mori ................... G06F 3/04845 |
| 2017/0372673 A1* | 12/2017 | Yeung ................... G09G 5/005 |

FOREIGN PATENT DOCUMENTS

| JP | 2008-015754 A | 1/2008 |
| JP | 2008-135812 A | 6/2008 |

* cited by examiner

*Primary Examiner* — Christopher K Peterson
(74) *Attorney, Agent, or Firm* — Venable LLP

(57) ABSTRACT

An image processing device includes a first acquisition unit configured to acquire an image, a second acquisition unit configured to acquire distribution information of an evaluated value corresponding to the image, an output unit configured to output the image or the distribution information of the evaluated value, a first operation unit that is an automatic reset type switch instructing switching of content that is output from the output unit; and a control unit configured to perform output control for switching the output unit between an output of the image and an output of the distribution information of the evaluated value according to switching of the first operation unit between activation and deactivation.

29 Claims, 10 Drawing Sheets

601a 603

602a 604

IMAGE PROCESSING DEVICE, IMAGING DEVICE, CONTROL METHOD FOR IMAGE PROCESSING DEVICE, AND RECORDING MEDIUM

This application claims the benefit of Japanese Patent Application No. 2019-117721, filed Jun. 25, 2019, which is hereby incorporated by reference wherein in its entirety.

BACKGROUND OF THE INVENTION

Field of the Invention

The invention relates to an image processing device, an imaging device, a control method for controlling an image processing device, and a recording medium.

Description of the Related Art

In the related art, an imaging device that can allow a user to easily understand whether a subject is in focus is known as an example of an image processing device. For example, Japanese Patent Laid-Open No. 2008-135812 discloses a video camera that converts a color image to a monochromatic image and colors a subject with a color corresponding to a subject distance in order to allow a user to intuitively understand a sense of distance to the focused subject at the time of a manual focusing operation. Japanese Patent Laid-Open No. 2008-15754 discloses an imaging device that detects a defocus value distribution in a captured image.

However, in the related art disclosed in Japanese Patent Laid-Open No. 2008-135812, since color information of an image is discarded, it is difficult to understand a finish of a recorded image. Since a focused area is merely emphasized and displayed, a user cannot understand a depth of field of a captured image. In the related art described in Japanese Patent Laid-Open No. 2008-15754, convenience for a user is not considered at all. In this way, in the related art, there is room for improvement in convenience for a user.

SUMMARY OF THE INVENTION

An objective of the present invention is to provide an image processing device with improved convenience for a user.

According to an embodiment, the present invention provides an image processing device including a first acquisition unit configured to acquire an image, a second acquisition unit configured to acquire distribution information of an evaluated value corresponding to the image, an output unit configured to output the image or the distribution information of the evaluated value, a first operation unit that is an automatic reset type switch instructing switching of content that is output from the output unit, and a control unit configured to perform output control for switching the output unit between an output of the image and an output of the distribution information of the evaluated value according to switching of the first operation unit between activation and deactivation.

Further features of the present invention will become apparent from the following description of exemplary embodiments with reference to the attached drawings.

DESCRIPTION OF THE EMBODIMENTS

Hereafter, an exemplary embodiment of the present invention will be described in detail with reference to the accompanying drawings. In the following embodiment, the invention is applied to an image processing device and a digital camera (an imaging device), which is an example of the image processing device.

Figure 1:
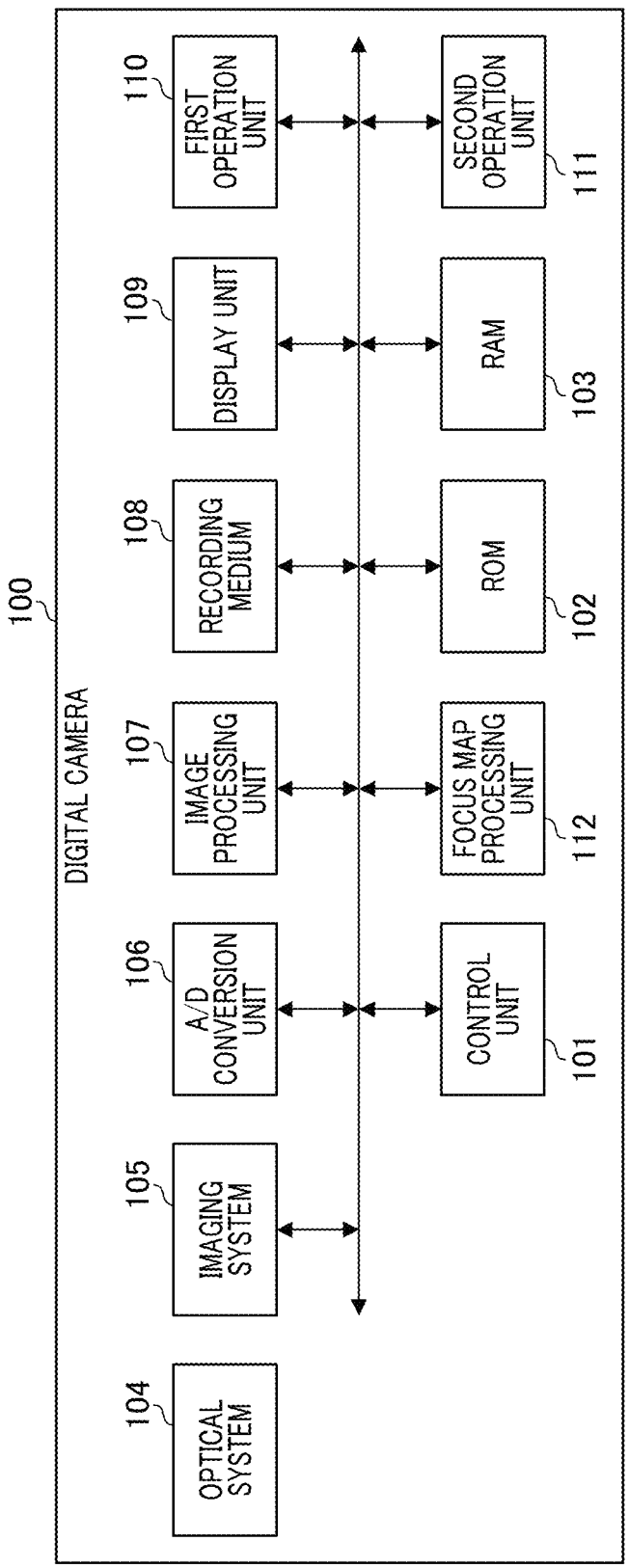
FIG. 1 is a diagram illustrating a configuration of a digital camera according to an embodiment of the present invention.

FIG. 1 is a block diagram illustrating a functional configuration of a digital camera according to an embodiment of the invention.

In FIG. 1, a digital camera that is an imaging device is described as an example of an image processing device, but the application range of the invention is not limited to the imaging device illustrated in FIG. 1. That is, the invention can be applied to an image processing device that outputs an image or a focus map that will be described later to an external device and causes the external device to display the image or the focus map in addition to the image processing device that displays the image or a focus map.

A digital camera 100 includes a control unit 101 to a focus map processing unit 112. The control unit 101 is, for example, a CPU and controls operations of the constituent units of the digital camera 100 by reading operation programs of the constituent units of the digital camera 100 from a ROM 102, loading the operation programs onto a RAM 103, and executing the operation programs. "CPU" is an abbreviation for "central processing unit." "ROM" is an abbreviation for "read only memory." "RAM" is an abbreviation for "random access memory." The ROM 102 is a rewritable nonvolatile memory and stores parameters required for the operations of the constituent units or the like in addition to the operation programs of the constituent units of the digital camera 100. The RAM 103 is a rewritable volatile memory and is used as a temporary storage area of data that is output in the operations of the constituent units of the digital camera 100.

An optical system 104 forms a subject image on an imaging unit 105. The optical system 104 includes, for example, a fixed lens, a magnification lens that changes a focal distance, and a focusing lens that adjusts a focal point. The optical system 104 includes an aperture and adjusts light intensity at the time of imaging by adjusting an aperture size of the optical system using the aperture.

The imaging unit 105 includes an imaging element such as a CCD or a CMOS sensor, photoelectrically converts an optical image formed on the imaging element by the optical system 104, and outputs the acquired analog image signal to an A/D conversion unit 106. "CCD" is an abbreviation for "charge coupled device." "CMOS" is an abbreviation for "complementary metal oxide semiconductor."

The A/D conversion unit 106 performs an A/D conversion process on the input analog image signal and outputs the acquired digital image data to the RAM 103 to store the digital image data. At this time, the control unit 101 stores vertical/horizontal information indicating whether an image has a vertical layout (an aspect ratio that is vertically long) or a horizontal layout (an aspect ratio that is horizontally long) in the RAM 103 along with the image.

An image processing unit 107 performs various types of image processing such as white balance adjustment, color interpolation, reduction/enlargement, and filtering on the image data stored in the RAM 103.

A recording medium 108 is, for example, a removable memory card and records an image which has been processed by the image processing unit 107 and an image which has been A/D-converted by the A/D conversion unit 106, which is stored in the RAM 103, as a recorded image.

A display unit 109 is a display device such as a liquid crystal display (LCD) and displays various types of information such as transmissively displaying a subject image which is input from the imaging unit 105. The image processing device according to the invention may not include the display unit 109. In this case, a display device having a function corresponding to the function of the display unit 109 may be provided outside the image processing device and the image processing device may include an output unit that outputs display data to the display device. In this case, an imaging device may be configured to include the image processing device and the display device. The display unit 109 is an example of an output unit configured to output an image or a focus map corresponding to the image. The digital camera 100 may include a transmission unit that transmits an image or a focus map to an external device as an example of the output unit. The control unit 101 may control the transmission unit such that output control for transmitting an image or a focus map to the external device and causing the external device to display the image or the focus map is performed.

A first operation unit 110 and a second operation unit 111 receive a user's operation input.

The first operation unit 110 is an operation device such as a push button. The first operation unit 110 may be a switch based on a mechanical operating member. A user instructs the digital camera 100 to perform various processes such as switching display content of the display unit 109 by operating the first operation unit 110.

The second operation unit 111 is an operation device such as a dial. A user instructs the digital camera 100 to perform various processes such as moving a display position of a display component such as an icon which is displayed on the display unit 109 by operating the second operation unit 111.

The focus map processing unit 112 acquires a focus map which is distribution information of an evaluated value corresponding to an image associated with an image signal acquired by the imaging unit 105 by analyzing the image signal. The focus map is information associated with a distribution of a subject (distribution information of focus information). The focus map is an image that is acquired by the focus map processing unit 112. The focus map processing unit 112 stores the acquired focus map in the RAM 103.

Figure 2:
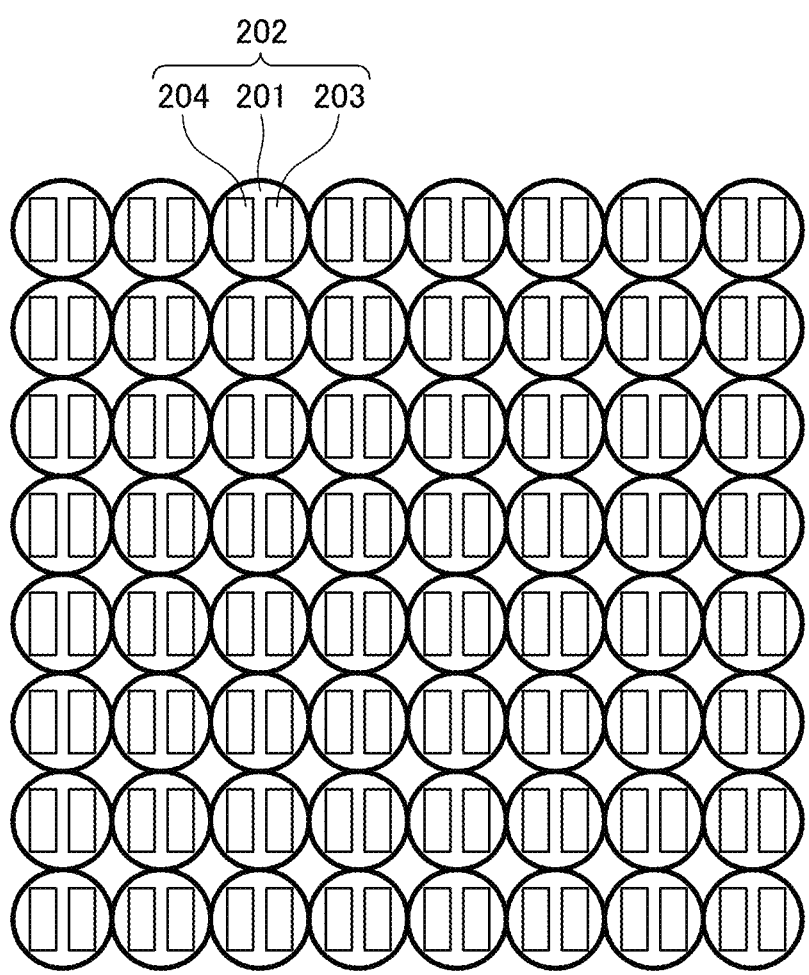
FIG. 2 is a diagram illustrating a configuration of an imaging unit according to the embodiment of the invention.

FIG. 2 is a diagram illustrating the configuration of the imaging unit 105.

The imaging unit 105 includes an imaging element illustrated in FIG. 2. The imaging element illustrated in FIG. 2 includes a plurality of pixels 202 in which a plurality of (two in FIG. 2) photoelectric conversion portions 203 and 204 are provided for one micro lens 201. The plurality of pixels 202 are regularly arranged two-dimensionally. The photoelectric conversion portions 203 and 204 of each pixel 202 photoelectrically convert light passing through different exit pupils of the optical system 104. Accordingly, an A image and a B image which are a pair of images (two images) are output from the pixel 202. That is, the imaging element outputs two images corresponding to light passing through different pupil areas.

The focus map processing unit 112 of the digital camera 100 outputs a distribution associated with a phase difference (a phase difference distribution) between the A image and the B image as a focus map under the control of the control unit 101. The focus map processing unit 112 may detect a defocus value distribution, for example, using the technique disclosed in Japanese Patent Laid-Open. No 2008-15754, and output the detected defocus value distribution as the focus map. The focus map processing unit 112 may acquire a distribution of an amount of shift which is a shift between the A image and the B image as the focus map. The amount of shift may be expressed in a unit of length such as micrometers by multiplying it by a detection pitch (a pitch of the same types of pixels). The focus map processing unit 112 may acquire a distribution of a value obtained by normalizing a defocus value with a focal depth ($2F\delta$ or $1F\delta$, where F denotes an aperture value and $\delta$ denotes an allowable diameter of a circle of confusion) as the focus map.

Figure 3:
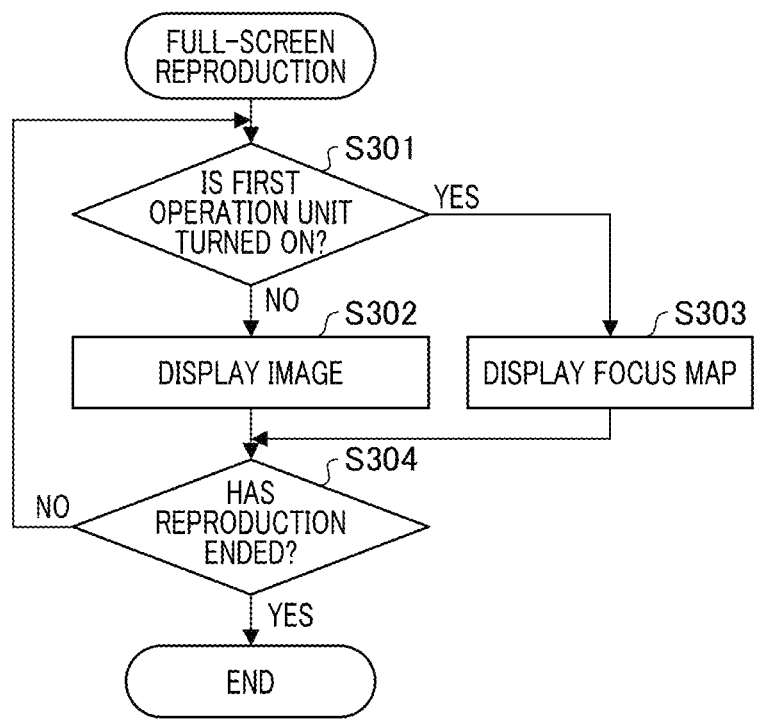
FIG. 3 is a flowchart illustrating a full-screen reproduction operation according to the embodiment of the invention.
Figure 4A:
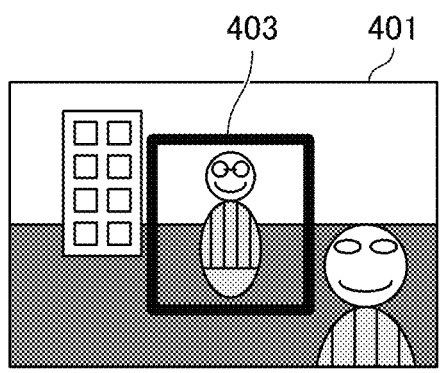
FIGS. 4A and 4B are diagrams illustrating the full-screen reproduction operation according to the embodiment of the invention.
Figure 4B:
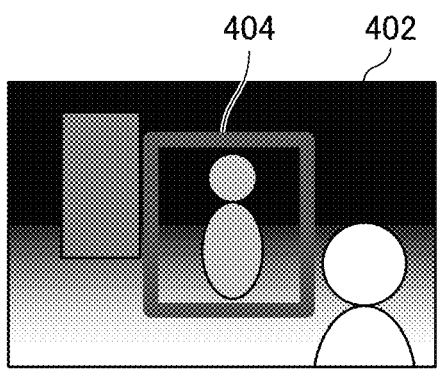

FIG. 3 is a flowchart illustrating an operation of reproducing an image or a focus map on a full screen on the display unit 109. FIGS. 4A and 4B are diagrams illustrating the full-screen reproduction operation on the display unit 109. Reference numeral 401 in FIG. 4A denotes an image. Reference numeral 402 in FIG. 4B denotes a focus map (a defocus value distribution). In the focus map 402, in-focus statuses of areas displayed in the image 401 are expressed in gray scale. The focus map 402 is expressed in continuous gray scale such that a background-blurred area is displayed in black, a proximity-blurred area is displayed in white, and an in-focus area (a focused area) is displayed in gray 50%. The invention is not limited thereto, and the gray scale values may be displayed in color values obtained by lookup table conversion or the like. The color values may be converted to colors with a color contour of blue~light blue~green~yellow~red in ascending order of the gray scale, and the in-focus status displayed in gray 50% may be converted to a green color in FIG. 4B.

Reference numeral 403 in FIG. 4A and reference numeral 404 in FIG. 4B denote auto-focus frames. The control unit 101 can switch between display and non-display of the auto-focus frames 403 and 404 in response to a user's operation. The auto-focus frames 403 and 404 are frames that indicate areas in which the digital camera 100 automatically performs a focusing operation.

The color of the auto-focus frame 403 in the image 401 and the color of the auto-focus frame 404 in the focus map 402 may be the same as or different from each other. For example, the background of the focus map 402 is often set to a dark color, but when the auto-focus frame 403 is set to a dark color and the auto-focus frame 404 is set to the same color, the auto-focus frame 404 and the background of the focus map 402 may be difficult to distinguish from each other. Therefore, in this case, even when the auto-focus frame 403 of the image 401 is set to a dark color, the auto-focus frame 404 of the focus map 402 may be set to a bright color such that it can be easily distinguished from the background of the focus map 402.

The control unit 101 performs a process of reproducing an image or a focus map on a full screen on the display unit 109 (the process flow illustrated in FIG. 3) by receiving a user's operation for instructing to perform full-screen reproduction. Description will be made below with reference to the flowchart illustrated in FIG. 3. First, the control unit 101 determines whether the first operation unit 110 in FIG. 1 is on (Step S301). In the full-screen reproduction process illustrated in FIG. 3, it is assumed that the first operation unit 110 operates as an automatic reset type switch. Specifically, the first operation unit 110 is constituted by a push button member which is turned on by a user's push and turned off by the user's release. The first operation unit 110 operates as an automatic reset type switch at the time of full-screen reproduction. The first operation unit 110 is switched to an activated state by a user's push and switched to a deactivated state by the user's release at the time of full-screen reproduction. The control unit 101 displays an image 401 on the display unit 109 when the first operation unit 110 is off (deactivated) (Step S302). That is, the control unit 101 performs output control of displaying the image 401 on the display unit 109. The control unit 101 displays the focus map 402 on the display unit 109 when the first operation unit 110 is on (activated) (Step S303). That is, the control unit 101 performs output control of displaying the focus map 402 on the display unit 109. The control unit 101 switches content which is displayed on the display unit 109 to the image 401 or the focus map 402 according to the state of the first operation unit 110.

The focus map 402 is generated by the focus map processing unit 112 to correspond to the image 401. Accordingly, the control unit 101 acquires the focus map 402 which is an example of distribution information of an evaluated value corresponding to the image 401. The time at which the focus map 402 is generated is a time at which the first operation unit 110 is turned on after the image 401 has been displayed on the display unit 109. The time at which the focus map 402 is generated may be a time at which the image 401 is displayed on the display unit 109.

The control unit 101 ends the process of reproducing an image or a focus map on a full screen on the display unit 109 (the process flow illustrated in FIG. 3) by receiving the user's operation for instructing to end the full-screen reproduction (Step S304: YES). The control unit 101 returns to Step S301 and repeatedly performs the process while switching the display on the display unit 109 to the image or the focus map until reproduction ends in Step S304 (Step S304: NO).

In this way, according to this embodiment, switching between the image 401 and the focus map 402 can be performed with few operations by configuring the first operation unit 110 as an automatic reset type switch for full-screen reproduction. Accordingly, it is possible to allow a focus and a depth of field of a captured scene to be conveniently understood without damaging visibility of the image.

Figure 10A:
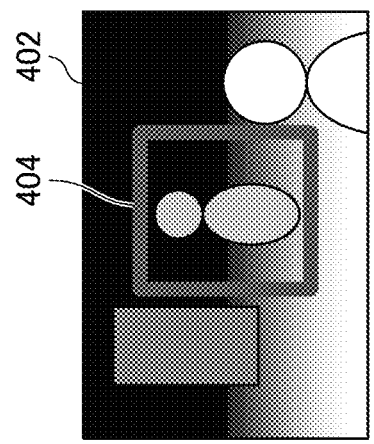
FIGS. 10A, 10B, and 10C are diagrams illustrating the full-screen reproduction operation according to the embodiment of the invention.
Figure 10B:
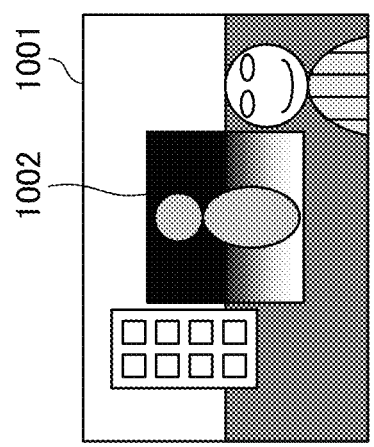
Figure 10C:
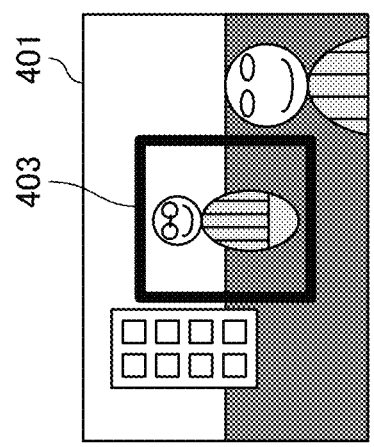

In this embodiment, the configuration in which switching between the image 401 and the focus map 402 is performed at the time of full-screen reproduction is employed, but the invention is not limited thereto. For example, the focus map of only the vicinity of the auto-focus frame 403 (for example, an area surrounded by the auto-focus frame 403) may be first displayed before the focus map 402 is displayed on a full screen. FIGS. 10A, 10B, and 10C are diagrams illustrating the operation. FIG. 10A is a diagram corresponding to FIG. 4A, and FIG. 10C is a diagram corresponding to FIG. 4B. When the first operation unit 110 is pushed and switched on (activated) in a state in which the image 401 illustrated in FIG. 10A is displayed on the display unit 109, the control unit 101 displays an image 1001 illustrated in FIG. 10B on the display unit 109. The image 1001 is an image in which a focus map 1002 of only the vicinity of the auto-focus frame 403 of the image 401 (a priority area) is displayed. When the first operation unit 110 is pushed continuously and maintained on for a predetermined period in the state in which the image 1001 illustrated in FIG. 10B is displayed on the display unit 109, the control unit 101 displays the focus map 402 illustrated in FIG. 10C on a full screen on the display unit 109. That is, the control unit 101 displays the focus map 402 on the display unit 109 after activation of the first operation unit 110 is maintained for a predetermined time.

Here, the image 1001 including the focus map 1002 (distribution information of an evaluated value in the priority area) in the vicinity of the auto-focus frame 403 is displayed earlier than the focus map 402, but the invention is not limited thereto. For example, the control unit 101 may perform object detection by performing a face detecting process on the image 401 or the like and determine a focus map display area (a priority area) on the basis of the object detection result. For example, the control unit 101 may display an image in which only an area of a face (the object detection result) in the image 401 is expressed in a focus map instead of the image 1001 in FIG. 10B. The object detecting process may employ any known method. The object detecting process may detect a face, a head, a pupil, an animal, or a vehicle as an object. An example of an object which is detected is a main subject.

The control unit 101 may simultaneously switch all the areas of the screen at the time of transition from the image 1001 in FIG. 10B to the focus map 402 in FIG. 10C. The control unit 101 may switch display of the image 1001 sequentially from an area of which generation has been completed in the focus map 402, gradually enlarge the area which is expressed in the focus map 402, and finally transition to full-screen display of the focus map 402. By employing this configuration, since a focus map can be promptly displayed at a time point at which a focus map of only the vicinity of the auto-focus frame is generated before the full-screen focus map 402 is generated, it is possible to decrease a user's operation stress.

The control unit 101 may change a focus display range in the focus map 1002 of the image 1001 illustrated in FIG. 10B and the focus map 402 illustrated in FIG. 10C. For example, when a focus map of a defocus value distribution is converted to colors with a color contour of blue~light blue~green~yellow~red in ascending order of gray scale values, a range of blue~red is displayed, for example, as a range of $-3F\delta$ to $+3F\delta$ in the focus map 1002 of FIG. 10B. On the other hand, the range is displayed, for example, as a range of $-10F\delta$ to $+10F\delta$ in the focus map 402 of FIG. 10C. By changing the focus display range in this way, for example, it is possible to switch between understanding of a fine focus change and understanding of a focus change of a full screen with a small blur ignored. When a focus of the vicinity of the auto-focus frame 403 in the focus map 1002 of FIG. 10B is checked, a fine focus change can be understood. When a focus of a full screen in the focus map 402 of FIG. 10C is checked, a focus change of a full screen can be understood with a small blur ignored.

Figure 5:
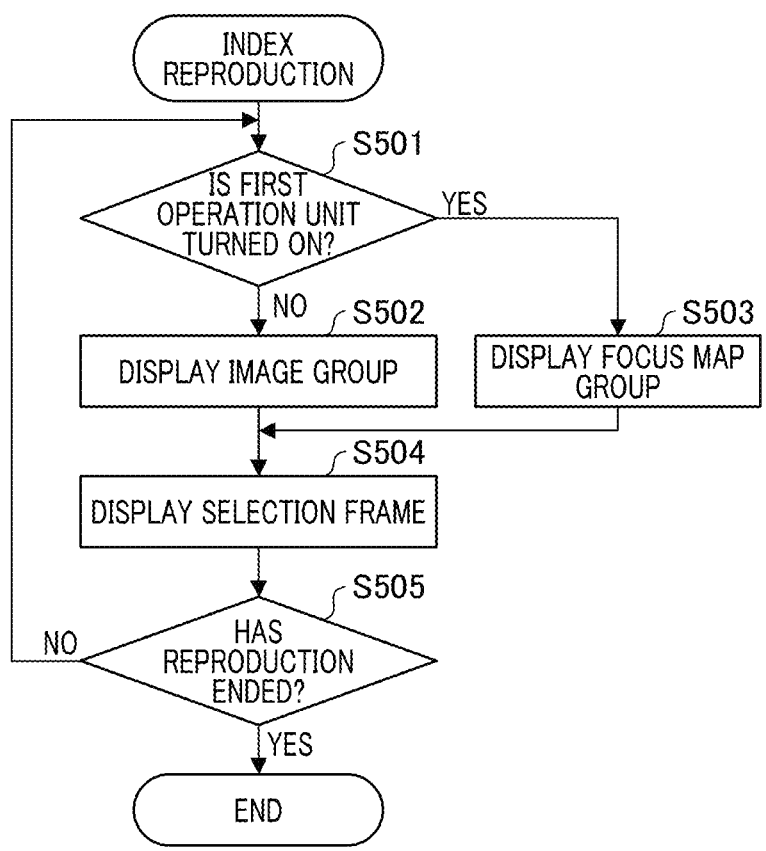
FIG. 5 is a flowchart illustrating an index reproduction operation according to the embodiment of the invention.
Figure 6A:
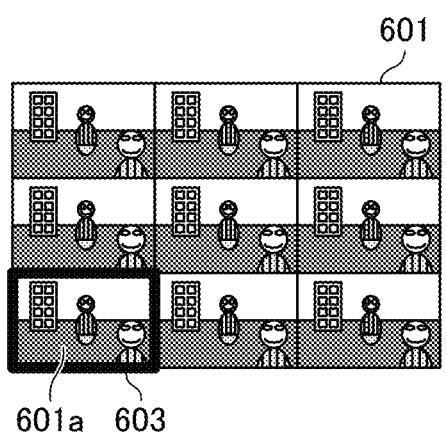
FIGS. 6A and 6B are diagrams illustrating the index reproduction operation according to the embodiment of the invention.
Figure 6B:
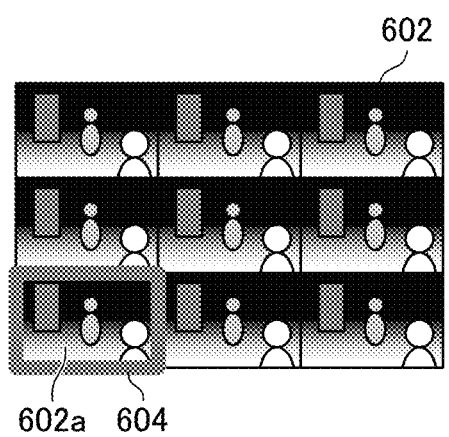

FIG. 5 is a flowchart illustrating an index reproduction operation of displaying a plurality of images and a plurality of focus maps in one screen on the display unit 109 illustrated in FIG. 1. FIGS. 6A and 6B are diagrams illustrating the index reproduction operation of displaying a plurality of images and a plurality of focus maps in one screen of the display unit 109. Reference numeral 601 in FIG. 6A denotes an image group. Reference numeral 603 in FIG. 6A denotes a selection frame indicating an image which is currently selected. The selection frame 603 is displayed at a position surrounding an image 601a which is currently selected out of the image group 601 which is displayed in an index manner. Reference numeral 602 in FIG. 6B denotes a focus map group 602. Reference numeral 604 in FIG. 6B denotes a selection frame indicating a focus map which is currently selected. The selection frame 604 is displayed at a position surrounding a focus map 602a which is current selected out of the focus map group 602 which is displayed in an index manner.

The color of the selection frame 603 of the image group 601 and the color of the selection frame 604 of the focus map group 602 may be the same or may be different from each other. For example, the background of the focus map group 602 often has a dark color, and when the selection frame 603 is set to a dark color and the selection frame 604 is set to the same color, the selection frame 604 may not be easily distinguished from the background of the focus map group 602. Therefore, in this case, when the selection frame 603 of the image group 601 is set to a dark color, the selection frame 604 of the focus map group 602 may be set to a light color such that it can be easily distinguished from the background of the focus map group 602.

The control unit 101 performs a process of reproducing the image group or the focus map group in an index manner on the display unit 109 (the process flow illustrated in FIG. 5) by receiving a user's operation for instructing to perform index reproduction. Description with reference to the flowchart illustrated in FIG. 5 will be made below. First, the control unit 101 determines whether the first operation unit 110 in FIG. 1 is on (Step S501). In the index reproduction process illustrated in FIG. 5, it is assumed that the first operation unit 110 operates as a position holding type switch. Specifically, the first operation unit 110 is configured as a push button member that toggles between on and off every push. The first operation unit 110 operates as a position holding type switch at the time of index reproduction. The control unit 101 displays the image group 601 on the display unit 109 when the first operation unit 110 is off (deactivated state) (Step S502). That is, the control unit 101 performs output control for displaying the image group 601 on the display unit 109. The control unit 101 displays the focus map group 602 on the display unit 109 when the first operation unit 110 is on (activated state) (Step S503). That is, the control unit 101 performs output control for displaying the focus map group 602 on the display unit 109. The control unit 101 switches content which is displayed on the display unit 109 between the image group 601 and the focus map group 602 depending on the state of the first operation unit 110.

The focus map group 602 is generated by the focus map processing unit 112 to correspond to the image group 601. Accordingly, the control unit 101 acquires the focus map group 602 which is an example of distribution information of evaluated values corresponding to the image group 601.

The time at which the focus map group 602 is generated is a time at which the first operation unit 110 is turned on after the image group 601 has been displayed on the display unit 109. The time at which the focus map group 602 is generated may be a time at which the image group 601 has been displayed on the display unit 109.

The second operation unit 111 is configured as a dial member. When a user rotates the second operation unit 111, the control unit 101 having received this operation moves a display position of the selection frame 603 on the display of the display unit 109 when the first operation unit 110 is on. The control unit 101 acquires the position of an image 601a which is currently selected and overlaps the selection frame 603 at that position (Step S504). When the user rotates the second operation unit 111, the control unit 101 having received this operation moves the display position of the selection frame 604 on the display of the display unit 109 when the first operation unit 110 is off. The control unit 101 acquires the position of the focus map 602a which is currently selected and overlaps the selection frame 604 at that position (Step S504).

The control unit 101 ends the process of reproducing an image or a focus map on the display unit 109 in an index manner (the process flow illustrated in FIG. 5) by receiving the user's operation for instructing to end the index reproduction (Step S505: YES). The control unit 101 returns to Step S501 and repeats the process flow while switching the index display of an image or the index display of a focus map on the display unit 109 until the reproduction in Step S505 ends (Step S505: NO).

According to the embodiment described above, by allowing the first operation unit 110 to serve as a position holding type switch at the time of index reproduction, it is possible to maintain the display state of the image group 601 or the display state of the focus map group 602 even when a user releases the first operation unit 110. Since the user can move the selection frame 604 while displaying the focus map group 602 by only operating the second operation unit 111 in a state in which the first operation unit 110 is turned on, the user can easily perform the operation with one hand.

Figure 7:
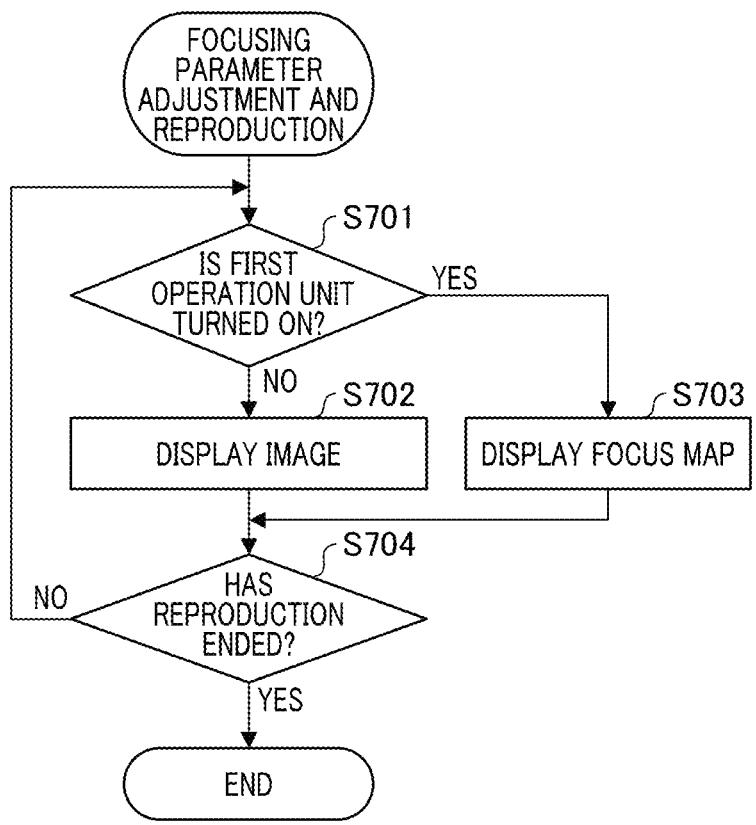
FIG. 7 is a flowchart illustrating a focusing parameter adjustment and reproduction operation according to the embodiment of the invention.

FIG. 7 is a flowchart illustrating an operation of displaying the image 401 in FIG. 4A and the focus map 402 in FIG. 4B on the display unit 109 to adjust a focus range which is an example of a focusing parameter. The focus range is an example of an evaluated value range of distribution information of evaluated values. A user can convert, for example, a focus map of a defocus value distribution to colors such as color contours through adjustment of the focus range. In the case of a color contour of blue~light blue~green~yellow~red in ascending order of gray scale values, a user can adjust, for example, the range of blue to red to a desired range such as $-3F\delta$ to $+3F\delta$ or $-10F\delta$ to $+10F\delta$. The control unit 101 displays, for example, an in-focus area in green in the color contour.

By this adjustment, a user can extend or narrow a range of green in the color contour which is considered to be in focus depending on the purpose. For example, a user can ascertain whether the image 401 is an in-focus state that is sufficient for the purpose by only checking a ratio of an in-focus area (an area of green) to the auto-focus frame 404. Accordingly, it is possible to appropriately determine an in-focus state of the image 401 without depending on a user's sight. An in-focus state may be determined on the basis of a main subject detection result such as a face detection result in addition to the auto-focus frame. An in-focus state may be determined on the basis of a ratio of an in-focus area to an area of the main subject detection result such as the face detection result in addition to the auto-focus frame 404.

In this embodiment, a user determines the ratio of an in-focus area (an area of green) to the auto-focus frame 404 with naked eyes, but the invention is not limited thereto. For example, the digital camera 100 may include a ratio determining unit that determines the ratio of an in-focus area to the auto-focus frame 404. In this case, the digital camera 100 can automatically perform determination of the ratio using the ratio determining unit. By employing this configuration, it is possible to further curb unevenness in a user's determination.

The control unit 101 performs a process of reproducing an image or a focus map in a focusing parameter adjustment manner on the display unit 109 by receiving a user's operation for instructing to perform focusing parameter adjustment and reproduction (the process flow illustrated in FIG. 7). Description will be made below with reference to the flowchart illustrated in FIG. 7. First, the control unit 101 determines whether the first operation unit 110 illustrated in FIG. 1 is on (Step S701). In the focusing parameter adjustment and reproduction process illustrated in FIG. 7, it is assumed that the first operation unit 110 operates as a position holding type switch. Specifically, the first operation unit 110 is configured as a push button member that toggles between on and off every push. The first operation unit 110 operates as a position holding type switch at the time of parameter adjustment and reproduction. The control unit 101 displays the image 401 on the display unit 109 when the first operation unit 110 is off (deactivated state) (Step S702). That is, the control unit 101 performs output control for displaying the image 401 on the display unit 109. The control unit 101 displays the focus map 402 on the display unit 109 when the first operation unit 110 is on (activated state) (Step S703). That is, the control unit 101 performs output control for displaying the focus map 402 on the display unit 109. The control unit 101 switches content which is displayed on the display unit 109 between the image 401 and the focus map 402 depending on the state of the first operation unit 110.

The focus map 402 is generated by the focus map processing unit 112 to correspond to the image 401. Accordingly, the control unit 101 acquires the focus map 402 which is an example of distribution information of evaluated values corresponding to the image 401. The time at which the focus map 402 is generated is a time at which the first operation unit 110 is turned on after the image 401 has been displayed on the display unit 109. The time at which the focus map 402 is generated may be a time at which the image 401 has been displayed on the display unit 109.

Focusing parameter adjustment is performed by operating the second operation unit 111 illustrated in FIG. 1. Specifically, the second operation unit 111 is configured as a dial member, and a user adjusts a focusing parameter by rotating the dial member. When the user rotates the second operation unit 111, the control unit 101 having received this operation adjusts the focusing parameter on the basis of a rotational position thereof. The control unit 101 displays a focusing map based on the focusing parameter which is currently set in Step S703.

The control unit 101 ends the process of reproducing an image or a focus map in a focusing parameter adjustment manner on the display unit 109 by receiving the user's operation for instructing to end focusing parameter adjustment and reproduction (the process flow illustrated in FIG. 7) (Step S704: YES). The control unit 101 returns to Step S701 and repeatedly performs the process while switching the display on the display unit 109 to the image or the focus map until reproduction ends in Step S704 (Step S704: NO).

In this embodiment, a focus range is exemplified as the focusing parameter, but the invention is not limited thereto. For example, the control unit 101 may employ a type of a color contour (a type of an evaluated value color conversion style of the distribution information of evaluated values) as the focusing parameter. Specifically, a color contour of blue~light blue~green~yellow~red in the descending order of gray scale values or a mode in which only an area in the vicinity of gray scale 50% is displayed in a green color may be selected as well as a color contour of blue~light blue~green~yellow~red in the ascending order of gray scale values. When only the area in the vicinity of gray scale 50% is displayed in a predetermined color, the control unit 101 may employ a type of the predetermined color as the focusing parameter. The control unit 101 may store various types of focusing parameters which have been set as a setting recipe in the ROM 102, and then the control unit 101 may call the setting recipe from the ROM 102 and set the called setting recipe in the next time or thereafter. By employing this configuration, it is possible to decrease a load of a user on setting a focusing parameter.

According to this embodiment described above, by allowing the first operation unit 110 to serve as a position holding type switch at the time of focusing parameter adjustment and reproduction, it is possible to maintain the display state of the image 401 or the display state of the focus map 402 even when a user releases the first operation unit 110 from the hand. Since the user can adjust the focusing parameter while displaying the focus map 402 by only operating the second operation unit 111 in a state in which the first operation unit 110 is turned on, the user can easily perform the operation with one hand.

In this embodiment, a defocus value distribution is displayed as a focus map without any change, but the invention is not limited thereto. For example, a map which transmissively overlaps a defocus value distribution on an image may be displayed as a focus map. By employing this configuration, since a user can see the image overlapping the focus map through the focus map when the focus map is displayed, it is possible to allow a user to easily understand correspondence between the focus map and the image.

Figure 8A:
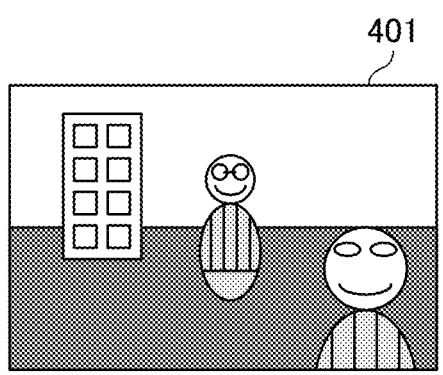
FIGS. 8A, 8B, 8C, and 8D are diagrams illustrating the full-screen reproduction operation according to the embodiment of the invention.
Figure 8B:
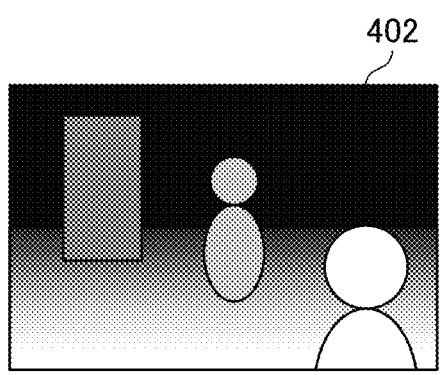
Figure 8C:
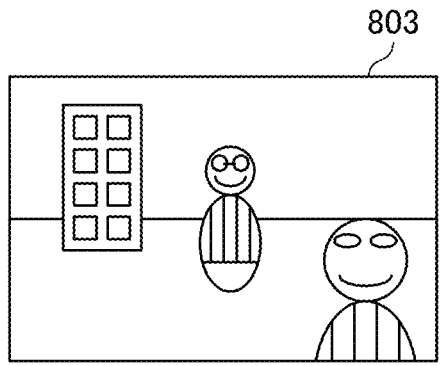
Figure 8D:
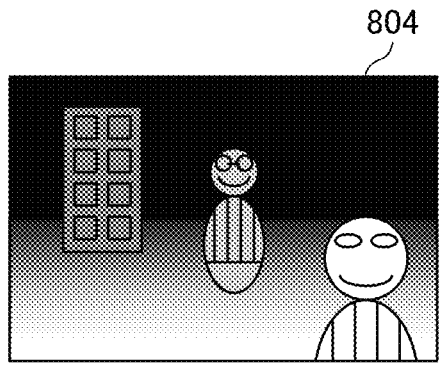

FIG. 8A is a diagram illustrating an image which is obtained by excluding the auto-focus frame 403 from the image 401 in FIG. 4A. FIG. 8B is a diagram illustrating an image which is obtained by excluding the auto-focus frame 404 from the focus map 402 in FIG. 4B. FIG. 8C is a diagram illustrating an edge map 803 in which an edge which is obtained by performing an edge detecting process on the image 401 in FIG. 8A is displayed. The edge detecting process is performed, for example, by the control unit 101. The edge detecting process is a process of acquiring an edge map 803 (edge information) in which colors of the image 401 is extracted and only an edge of a subject is displayed. FIG. 8D is a diagram illustrating a focus map 804 in which the edge map 803 is overlapped on the focus map 402 in FIG. 8B. The focus map 402 in FIG. 8B is a defocus value distribution which is a focus map. The control unit 101 may display the focus map 804 illustrated in FIG. 8D instead of the focus map 402 illustrated in FIG. 4B in Step S303 in FIG. 3. By employing this configuration, since a user can see the edge of the image overlapping the focus map when the focus map 804 is displayed, it is possible to allow a user to easily understand correspondence between a focus map and an image. In this case, since an edge in which colors of an image have been excluded is used, colors of a defocus value distribution are not mixed with the colors of the image and a user can easily see the colors of the defocus value distribution and easily understand the defocus values.

Figure 9A:
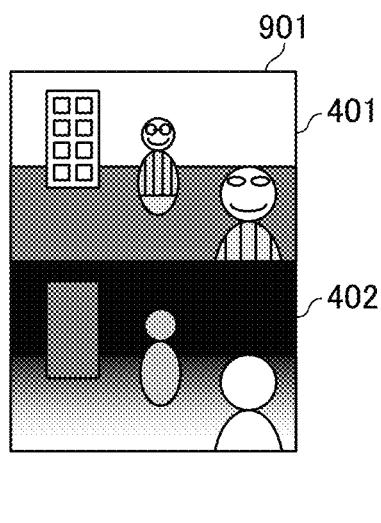
FIGS. 9A and 9B are diagrams illustrating the full-screen reproduction operation of reduction layout according to the embodiment of the invention.
Figure 9B:
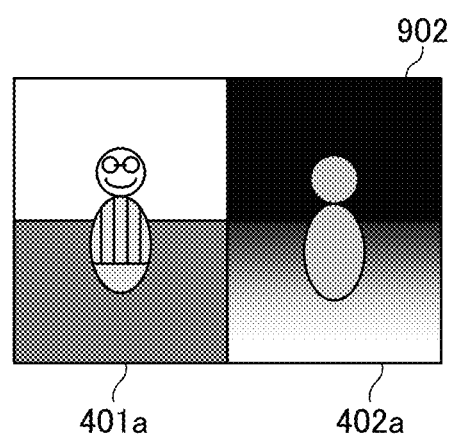

FIGS. 9A and 9B are diagrams illustrating an example in which a reduced layout of an image and a focus map is displayed. FIG. 9A is a diagram illustrating content 901 in which an image 401 with a horizontal layout and a focus map 402 corresponding to the image 401 are reduced and are arranged vertically and are displayed in one screen. FIG. 9B is a diagram illustrating content 902 in which an image 401*a* with a vertical layout and a focus map 402*a* corresponding to the image 401*a* are reduced, arranged horizontally, and displayed in one screen. The process of reducing the image 401 and the focus map 402 and arranging them vertically is performed, for example, by the control unit 101. The process of reducing the image 401*a* and the focus map 402*a* and arranging them horizontally is performed, for example, by the control unit 101. In Step S303 illustrated in FIG. 3, the control unit 101 may display the content 901 illustrated in FIG. 9A and the content 902 illustrated in FIG. 9B instead of the focus map 402 illustrated in FIG. 4B. In this case, the control unit 101 performs a process of displaying an image or content (the content 901 or the content 902) in which an image and a focus map are laid out in one screen on the display unit 109 by receiving a user's operation for instructing to perform layout display. By employing this configuration, a user can see an image and a defocus value distribution en bloc on the basis of the content 901 or the content 902 without switching the display on the display unit 109 between the image and the focus map. The control unit 101 can determine whether an image has a vertical layout or a horizontal layout on the basis of vertical/horizontal layout information which is stored along with the image in the RAM 103. The control unit 101 may perform determination of whether the display unit 109 has a horizontally long screen (a display area with an aspect ratio which is horizontally long) or a vertically long screen (a display area with an aspect ratio which is vertically long) using any existing method.

In the above description with reference to FIG. 3, the first operation unit 110 which is an operation unit configured to switch content which is displayed is a push button member, but the invention is not limited thereto. For example, the digital camera 100 may include a vertical/horizontal posture sensor that detects whether the display screen of the display unit 109 is a screen that is vertically long or the display screen of the display unit 109 is a screen that is horizontally long, and the control unit 101 may change content that is displayed depending on a result of detection from the vertical/horizontal posture sensor. Specifically, when an image with a horizontal layout is displayed in a screen that is horizontally long and the vertical/horizontal posture sensor detects that the screen is changed to a screen that is vertically long, the control unit 101 switches the content that is displayed on the display unit 109 to the content 901 for an image with a horizontal layout. In this case, the first operation unit 110 is a switch that reacts with the posture of the display unit 109. When an image with a vertical layout is displayed in a screen that is vertically long and the vertical/horizontal posture sensor detects that the screen is changed to a screen that is horizontally long, the control unit 101 switches the content that is displayed on the display unit 109 to the content 902 for an image with a vertical layout. By employing this configuration, the display screen of the display unit 109 can be efficiently used when the focus map is displayed in a reduced layout. The vertical/horizontal posture sensor is, for example, an acceleration sensor. The vertical/horizontal posture sensor may employ any existing sensor.

In this embodiment, the defocus value distribution is acquired as the focus map using the imaging unit 105 including the pixels 202 illustrated in FIG. 2, but the invention is not limited thereto. For example, the invention may employ a configuration in which distribution information of a distance (distance information) that is acquired using a time of flight (TOF) method, or the like, is acquired as the focus map. This distance information is depth information indicating a depth in a depth direction of a subject in an image. By employing this configuration, a user can understand an in-focus state and use the focus map to determine a focal distance of an optical system. When a distance is normalized with a front depth of field and a rear depth of field, it is possible to more conveniently understand an in-focus state.

The control unit 101 may acquire distribution information of distance information using the parallax of a multi-eye optical system in which a plurality of lenses are arranged instead of the TOF method or may acquire the distribution information of distance information by converting a defocus value to a distance.

In this embodiment, the first operation unit 110 is configured as a push button member, but the invention is not limited thereto. The first operation unit 110 may be configured as a lever member, or the like. The first operation unit 110 may be a switch of a type that reacts with a change in pressure or a change in capacitance on a display unit surface that is assembled into the display unit 109 illustrated in FIG. 1. In this case, the display unit 109 may be a member that allows input and display of a pressure sensitive type or a capacitance type such as a touch panel. The first operation unit 110 may be a switch of a type that reacts with press on the surface of the display unit 109 (a switch based on an electronic operation member configured on the display unit), for example, a "3D Touch." The first operation unit 110 may be a switch of a type that reacts with whether an imaging parameter is being adjusted. The imaging parameter is, for example, a focus adjustment parameter or an aperture adjustment parameter.

In this embodiment, a still image and a still focus map are reproduced, but the invention is not limited thereto and may be applied to a configuration in which a moving image and a moving image focus map are reproduced.

In the invention, output control may be performed such that the display is switched to display for displaying additional information other than a focus map. The additional information is, for example, an imaging condition such as an imaging date and time, an aperture, a shutter speed, a focal distance, or an imaging mode or an image processing parameter such as whether shading correction is to be performed or whether white balance is to be corrected.

In this embodiment, an image and a focus map are reproduced, but the invention is not limited thereto and may be applied to a case in which an image and a map of an evaluated value other than a focus (distribution information of an evaluated value) are reproduced. The evaluated value is, for example, a focus of an image (focus information), exposure of an image (exposure information), or a contrast value of an image (contrast information). The evaluated value may be an amount of blur (blur information) of an image based on a motion vector acquired from image data, or the like. The evaluated value may be distance information of an image which is acquired by additionally converting a focus map to a subject distance on the basis of lens information or imaging conditions. The evaluated value may be normal direction distribution information of an image which is acquired by image analysis. The evaluated value may be probability distribution information of semantic area division of an image (for example, recognition score distribution information of a person, a plant, or behavior detection), which is acquired by performing subject detection, motion detection, or the like, by image analysis. The valuated value may be a degree of halation or black crush (halation/black crush information) of an image that is acquired by determining a level of an image signal.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing device comprising:
an operation unit; and
at least one processor and a memory holding a program which makes the processor function as:
   a first acquisition unit configured to acquire an image;
   a second acquisition unit configured to acquire distribution information of an evaluated value corresponding to the image;
   an output unit configured to output the image or the distribution information of the evaluated value; and
   a control unit configured to perform output control for switching the output unit between an output of the image and an output of the distribution information of the evaluated value according to switching of the operation unit between activation and deactivation,
wherein the operation unit includes a first operation unit which is an automatic reset type switch instructing switching of content which is output from the output unit.

2. The image processing device according to claim 1, wherein the operation unit further includes a second operation unit which is a position holding type switch instructing switching of the content which is output from the output unit, and
wherein, when a plurality of images or a plurality of pieces of distribution information of the evaluated value are output on one screen, the control unit performs output control for switching between an output of the plurality of images and an output of the plurality of pieces of distribution information of the evaluated value according to switching of the second operation unit between on and off.

3. The image processing device according to claim 2, wherein the processor further functions as a display unit configured to display the image or the distribution information of the evaluated value which is output, and
wherein the second operation unit includes one of a switch based on a mechanical operating member, and a switch based on an electronic operating member which is provided on the display unit.

4. The image processing device according to claim 1, wherein the operation unit further includes a second operation unit which is a position holding type switch instructing switching of the content which is output from the output unit, and
wherein, when an adjustment parameter of the distribution information of the evaluated value is adjusted, the control unit performs output control for switching between an output of the image and an output of the distribution information of the evaluated value according to switching of the second operation unit between on and off.

5. The image processing device according to claim 4, wherein the adjustment parameter is an evaluated value range of the distribution information of the evaluated value.

6. The image processing device according to claim 4, wherein the adjustment parameter is a type of an evaluated value color conversion style of the distribution information of the evaluated value.

7. The image processing device according to claim 4, wherein the memory stores the adjustment parameter as a setting recipe.

8. The image processing device according to claim 1, wherein the control unit performs output control for outputting the distribution information of the evaluated value in a priority area according to activation of the first operation unit, and switching to outputting of the distribution information of the evaluated value on a full screen after the activation of the first operation unit is maintained for a predetermined time.

9. The image processing device according to claim 8, wherein the priority area is determined on the basis of an auto-focus frame or an object detection result.

10. The image processing device according to claim 1, wherein the control unit performs output control for transmissively overlapping the distribution information of the evaluated value with the image and outputting the result when the distribution information of the evaluated value is output.

11. The image processing device according to claim 1, wherein, when the distribution information of the evaluated value is output, the control unit performs output control for overlapping edge information of the image with the distribution information of the evaluated value and outputting the result.

12. The image processing device according to claim 1, wherein the operation unit further includes a third operation unit configured to instruct switching of the content which is output from the output unit, and
wherein, when the first content in which the image and the distribution information of the evaluated value are laid out on one screen is output, the control unit performs output control for switching between an output of the image and an output of a first content according to switching of the third operation unit between on and off.

13. The image processing device according to claim 12, wherein the processor further functions as a display unit configured to display the image or the distribution information of the evaluated value which is output, and
wherein the third operation unit includes one of a switch that reacts with a posture of the display unit, a switch based on a mechanical operating member, and a switch based on an electronic operating member which is provided on the display unit.

14. The image processing device according to claim 1, wherein the distribution information of the evaluated value includes one of distribution information of focus information of the image, distribution information of exposure information of the image, distribution information of contrast information of the image, distribution information of blur information of the image, and distribution information of halation/black crush information.

15. The image processing device according to claim 14, wherein the distribution information of the focus information includes one of distribution information of a phase difference between two images which are output from an imaging element that outputs two images corresponding to light passing through different pupil areas, distribution information of an amount of shift between the two images, distribution information of a defocus value, and distribution information of a distance to a subject indicating a depth in a depth direction of a subject in an image.

16. The image processing device according to claim 1, wherein the processor further functions as a display unit configured to display the image or the distribution information of the evaluated value which is output, and
wherein the first operation unit includes one of a switch that reacts with adjustment of a parameter, a switch based on a mechanical operating member, and a switch based on an electronic operating member which is provided on the display unit.

17. An imaging device comprising:
an operation unit; and
at least one processor and a memory holding a program which causes the processor to function as:
a first acquisition unit configured to acquire an image;
a second acquisition unit configured to acquire distribution information of an evaluated value corresponding to the image;
an output unit configured to output the image or the distribution information of the evaluated value;
a first operation unit which is an automatic reset type switch instructing switching of content which is output from the output unit;
a control unit configured to perform output control for switching the output unit between an output of the image and an output of the distribution information of the evaluated value according to switching of the operation unit between activation and deactivation; and
a display unit configured to display the image or the distribution information of the evaluated value which is output from the output unit,
wherein the operation unit includes a first operation unit which is an automatic reset type switch instructing switching of the content which is output from the output unit.

18. A control method for an image processing device including a first operation unit which is an automatic reset type switch, the control method comprising:
acquiring an image;
acquiring distribution information of an evaluated value corresponding to the image;
outputting the image or the distribution information of the evaluated value; and
performing output control for switching between an output of the image and an output of the distribution information of the evaluated value according to switching of the first operation unit between activation and deactivation in the outputting of the image or the distribution information of the evaluated value.

19. A non-transitory recording medium storing a control program which is stored as a computer program for making a computer function as respective units of an image processing device including a first operation unit which is an automatic reset type switch, the image processing device comprising:
a first acquisition unit configured to acquire an image;
a second acquisition unit configured to acquire distribution information of an evaluated value corresponding to the image;
an output unit configured to output the image or the distribution information of the evaluated value; and
a control unit configured to perform output control for switching the output unit between an output of the image and an output of the distribution information of the evaluated value according to switching of the first operation unit between activation and deactivation.

20. The image processing device according to claim 1, wherein the control unit performs output control for switching the output unit between the output of the image and the output of the distribution information according to switching of the first operation unit between activation and deactivation.

21. The image processing device according to claim 1, wherein the distribution information of the evaluated value includes distribution information of focus information of the image.

22. The image processing device according to claim 1, wherein the first operation unit is constituted by a push button member that is turned on by a push operation by a user and turned off by a release operation by the user, and
wherein the first operation unit is switched to the activation by the push operation by the user and switched to the deactivation by the release operation by the user.

23. An image processing device comprising:
(A) an operation unit; and
(B) at least one processor and a memory holding a program that cause the processor to function as:
(a) a first acquisition unit configured to acquire an image;
(b) a second acquisition unit configured to acquire distribution information of an evaluated value corresponding to the image;

(c) an output unit configured to output the image or the distribution information of the evaluated value; and
(d) a control unit configured to perform output control for switching the output unit between an output of the image and an output of the distribution information of the evaluated value according to switching of the operation unit between activation and deactivation,
wherein the operation unit includes a second operation unit that is a position holding type switch instructing switching of the content that is output from the output unit, and
wherein the control unit performs output control for switching between an output of the plurality of images and an output of the plurality of pieces of distribution information of the evaluated value according to switching of the second operation unit between on and off.

24. The image processing device according to claim 23, wherein, when a plurality of images or a plurality of pieces of distribution information of the evaluated value are output on one screen, the control unit performs output control for switching between an output of the plurality of images and an output of the plurality of pieces of distribution information of the evaluated value according to switching of the second operation unit between on and off.

25. The image processing device according to claim 23, wherein, when an adjustment parameter of the distribution information of the evaluated value is adjusted, the control unit performs output control for switching between an output of the image and an output of the distribution information of the evaluated value according to switching of the second operation unit between on and off.

26. The image processing device according to claim 23, wherein the control unit performs output control for transmissively overlapping the distribution information of the evaluated value with the image and outputting the result when the distribution information of the evaluated value is output.

27. The image processing device according to claim 23, wherein, when the distribution information of the evaluated value is output, the control unit performs output control for overlapping edge information of the image with the distribution information of the evaluated value and outputting the result.

28. The image processing device according to claim 23, wherein the operation unit further includes a third operation unit configured to instruct switching of the content that is output from the output unit, and
wherein, when the first content in which the image and the distribution information of the evaluated value are laid out on one screen is output, the control unit performs output control for switching between an output of the image and an output of a first content according to switching of the third operation unit between on and off.

29. The image processing device according to claim 23, wherein the distribution information of the evaluated value includes one of distribution information of a phase difference between two images that are output from an imaging element that outputs two images corresponding to light passing through different pupil areas, distribution information of an amount of shift between the two images, distribution information of a defocus value, and distribution information of a distance to a subject indicating a depth in a depth direction of a subject in an image.

\* \* \* \* \*